Feb. 10, 1942.  A. J. DEACON  2,272,515
HARNESS FOR PIPE JOINTS
Filed Aug. 26, 1939

Inventor
Alexander J. Deacon.
By R. S. C. Dougherty
Attorney

Patented Feb. 10, 1942

2,272,515

UNITED STATES PATENT OFFICE 2,272,515

HARNESS FOR PIPE JOINTS

Alexander J. Deacon, Dormont, Pa., assignor to Bethlehem Steel Company, a corporation of Pennsylvania Application August 26, 1939, Serial No. 292,031

4 Claims. (Cl. 285—137)

My invention relates to couplings for pipes, conduits or the like, and more especially to a harness for steel pipe joints and used in addition to the regular coupling which connects and forms a seal between the ends of the pipe sections and is adapted to enable the joint to withstand longitudinally the full hydrostatic pressure in the pipe.

One of the objects of my invention relates to forming a harness for a pipe joint in which the lugs are secured to the ends of the adjacent pipe sections and spread in such a manner that they distribute the load over a considerable area thus decreasing the tendency to buckle the pipe as would be the case if this load were localized.

Another feature of my invention relates to a harness for a pipe joint in which only two bolts are used, these bolts being located horizontally in alignment with each other on opposite sides of the pipe so that the joint may have some freedom of movement vertically to adapt itself to any settlement of the ground or change of grade or the like.

Another object of my invention relates to the manner of constructing the lugs of pressed sheet metal sections which are formed in the desired shape and then welded together.

Still another object of my invention relates to the manner of forming the washer seats in the bearing plates of the lugs and the washers on the bolts for engaging the same with arc shaped complementary surfaces to allow the washers to turn slightly to adjust themselves to the relative movement of the pipe sections.

Other objects relate to various features of construction and arrangement of parts which will appear more fully hereinafter.

Having thus given a general description of the advantages of my invention, I will now in order to make the same more clear refer to the annexed sheet of drawings forming a part of this specification and in which like characters of reference indicate like parts:

Figure 1:
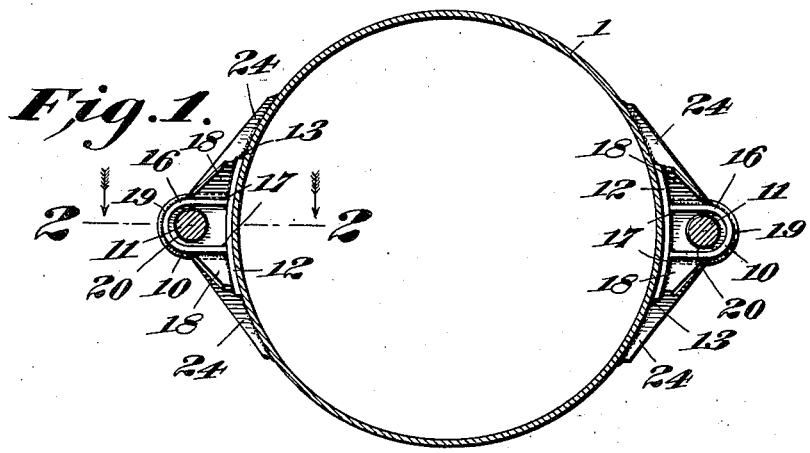
Figure 1 is a vertical transverse section of a pipe taken near the coupling on the line 1—1 of Fig. 2, illustrating the application of my invention.
Figure 2:
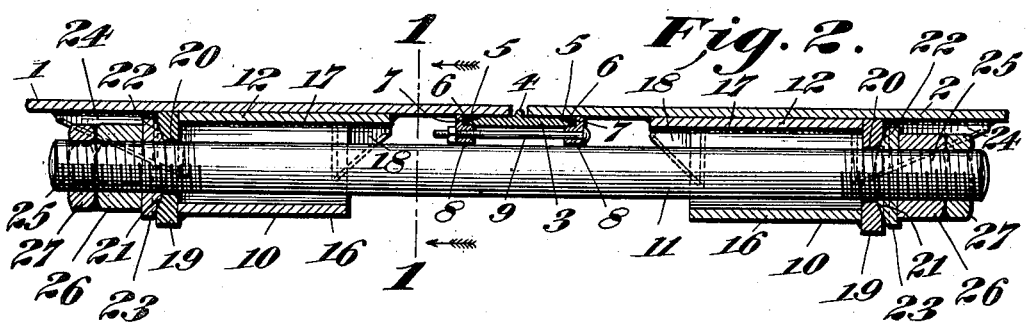
Fig. 2 is a longitudinal section taken on the line 2—2 of Fig. 1, but drawn on a larger scale than Fig. 1.
Figure 3:
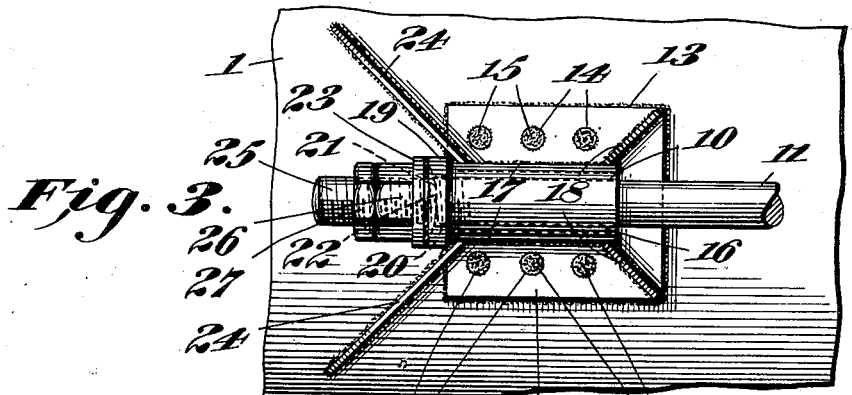
Fig. 3 is a plan view showing one of the lugs and the connecting bolt attached thereto.

Referring now to the various characters of reference on the drawing, the numerals 1 and 2 designate the plane ends of two pipe sections which are connected together by means of a coupling of well known construction comprising a middle annular ring 3, having a central inwardly extending pipe stop projection 4 and beveled ends 5 engaging gasket rings 6. These gasket rings 6 are each seated in an annular groove 7 of follower rings 8 which are connected together by means of bolts 9.

It is necessary that longitudinal movement of the meeting ends of fluid conveying pipes be prevented, because such movement breaks the seal between the ends of the pipe sections and permits escape of the fluid to be conveyed.

The couplings now used for connecting pipes especially those of large size do not offer sufficient resistance to such movement. The present invention is adapted to form a harness for reinforcing the coupling and prevent longitudinal relative movement of the meeting ends of pipes but at the same time allow for a certain amount of flexibility vertically.

The harness comprises a lug 10 welded in horizontal alignment to the opposite sides of the end portion of each of the pipe sections. The lugs on one end portion of one pipe section are disposed in longitudinal alignment with those on the adjacent end portion of the pipe section, and each pair of longitudinally disposed lugs on opposite sides of the ends of the pipe sections are connected together by means of a bolt 11. The lugs are all constructed of plate metal in the same manner and a description of one will apply to all, and comprises a rectangular base plate 12 having its edges welded to the pipe section as at 13 and provided with perforations 14 near its top and bottom edges for plug welds 15. A bent U-shaped plate 16 has the ends of its legs welded as at 17 to the central portion of the base plate 12. The outer end of this bent U-shaped plate 16 is flush with the outer edge of the base plate 12 and extends inwardly therefrom nearly to the inner edge of the said base plate where it stops short of the same and is reinforced at the sides of the inner end by means of a pair of inwardly diverging flanges 18 formed of triangular shaped plates which have their edges welded to the inner ends of the bent U-shaped plate 16 and to the base plate 12. A U-shaped bearing plate 19 is welded to the outer ends of the bent U-shaped plate 16 and the outer edge of the base plate 12 and to the outer surface of the pipe section. The U-shaped bearing plate 19 is perforated as at 20 for the passage of the bolt 11, and has a concaved outer bearing surface 21 on which is seated the complementary convex bearing surface 22 of a washer 23. A pair of flanges 24 formed of plates cut into the desired shape have their edges welded at their inner ends to the sides of the outer end of the bent U-shaped plate 16 and the base plate 12 and diverge outwardly therefrom and welded to the pipe section. These flanges 24 are considerably longer than the flanges 18 and extend some distance from the body of the lug proper to more fully brace and reinforce the body portion of the lug.

The bolts 11 each connecting two horizontally aligned lugs on opposite sides of the end portions of the pipe sections have their ends extending through the bent U-shaped plates 16 forming the body portion of each of the lugs and are screw-threaded as at 25 and adapted to extend through the perforations 20 in the U-shaped bearing plates 19 and washers 23 and held in position by means of nuts 26 and lock nuts 27.

In this manner of forming a harness for steel pipe joints the lugs are light and well braced and adapted to distribute the load over a considerable area on the end portions of the pipe sections and the bolts connecting the lugs hold the meeting ends of the pipe sections against longitudinal movement with respect to each other.

Although I have shown and described my invention in considerable detail, I do not wish to be limited to the exact and specific details shown and described, but may use such substitutions, modifications or equivalents thereof, as are embraced within the scope of my invention or as pointed out in the claims.

Having thus described my invention, what I claim as new and desire to secure by Letters Patent is:

1. A harness for couplings connecting the adjacent ends of a pair of pipe sections, comprising a lug secured in horizontal transverse alignment to opposite sides of the end portion of each pipe section adjacent to the coupling, each lug on the end portion of one pipe section being disposed in longitudinal alignment with a lug on the end portion of the adjacent pipe section, a concaved bearing surface at the outer end of each lug, a bolt extending over the coupling having screw-threaded ends connecting each of the longitudinally aligned pairs of lugs, a washer mounted upon each end of the bolt having a convex inner face adapted for sliding movement on the concaved bearing surface of each lug, and means carried by each end of the bolt for holding the convex inner face of the washer in engagement with the concaved bearing surface of the lug.

2. A harness for couplings connecting the adjacent ends of a pair of pipe sections, a pair of lugs secured to opposite sides of each end portion of the pipe section in transverse alignment adjacent to the coupling, each lug on the end portion of one pipe section being disposed in horizontal longitudinal alignment with a lug on the end portion of the adjacent pipe section, said lugs being formed of sheet metal each metal comprising a base plate secured to the pipe section, a bent U-shaped plate having the ends of its legs secured to the central portion of the base plate, a perforated bearing plate having a concaved outer surface secured to one end of the bent U-shaped plate, a bolt extending over the coupling having a screw-threaded end portion extending through the bent U-shaped plate and bearing plate, a washer on the bolt having a convex inner surface for engaging the concaved bearing surface of the bearing plate, and a nut threaded on the end portion of the bolt for engaging the washer to hold the convex inner surface of the washer in engagement with the concaved bearing surface of the bearing plate.

3. A harness for connecting the ends of a pair of pipe sections or the like, comprising a lug secured to the opposite sides of the end portion of each pipe section in transverse horizontal alignment, each lug on the end portion of one pipe section being disposed in longitudinal alignment with a lug on the adjacent pipe section, said lugs each having a base portion welded to the side of the pipe section, a U-shaped body portion and a concaved outer end, a pair of diverging flanges extending from opposite ends of the U-shaped body portion, a bolt having its opposite ends screw-threaded and extending through a lug for connecting each pair of longitudinally aligned lugs together, a washer on each end of the bolt, said washers each having a convex inner surface adapted to engage the concaved surface at the end of the lugs, and a nut on each threaded end of the bolt for holding the convex surfaces of the washers in engagement with the concaved surfaces at the ends of the lugs.

4. A harness for connecting the ends of a pair of pipe sections or the like, comprising a lug secured to the opposite sides of the end portion of each pipe section in transverse horizontal alignment, each lug on the end portion of one pipe section being disposed in longitudinal alignment with a lug on the adjacent pipe section, said lugs each having a base portion welded to the side of the pipe section, a U-shaped body portion and a perforated end portion having a concaved surface, diverging flanges extending from the inner end of the U-shaped body portion to the inner corners of the base portion, flanges extending from the outer ends of the U-shaped body portion and diverging outwardly therefrom with their lower edges welded to the pipe section, a pair of bolts having their opposite ends threaded each extending through a lug for connecting a pair of longitudinally aligned lugs together, a washer on each end of the bolts each having a convex inner surface adapted to engage the concaved surface at the end of the lugs, and a nut on each threaded end of the bolt for holding the convex surfaces of the washers in engagement with the concaved surfaces at the ends of the lugs.

ALEXANDER J. DEACON.